March 2, 1948.  J. SALLES  2,437,048
APPARATUS FOR DETERMINING THE RELATIVE DIFFERENCES
OF SPEED OF TWO ROTARY ELEMENTS
Filed Jan. 16, 1945  3 Sheets-Sheet 1

INVENTOR
JAIME SALLES
BY Haseltine, Lake & Co.
ATTORNEY

March 2, 1948.  J. SALLES  2,437,048
APPARATUS FOR DETERMINING THE RELATIVE DIFFERENCES
OF SPEED OF TWO ROTARY ELEMENTS
Filed Jan. 16, 1945  3 Sheets-Sheet 2

INVENTOR
JAIME SALLES
BY Haseltine, Lake & Co.
ATTORNEY

March 2, 1948. J. SALLES 2,437,048
APPARATUS FOR DETERMINING THE RELATIVE DIFFERENCES
OF SPEED OF TWO ROTARY ELEMENTS
Filed Jan. 16, 1945 3 Sheets-Sheet 3

INVENTOR
JAIME SALLES
BY Haseltine, Lake & Co.
ATTORNEY

Patented Mar. 2, 1948

2,437,048

UNITED STATES PATENT OFFICE 2,437,048

APPARATUS FOR DETERMINING THE RELATIVE DIFFERENCES OF SPEED OF TWO ROTARY ELEMENTS

Jaime Sallés, Montevideo, Uruguay

Application January 16, 1945, Serial No. 573,126

2 Claims. (Cl. 235—103.5)

The present invention relates to apparatus for the determination of the relative differences of velocity of two rotary shafts, and especially, for the adjustment of electric energy meters.

More specifically, the invention is concerned with that type of testing apparatus in which the speed of a rotating member, such as a disc or shaft of the meter or other apparatus to be tested is compared with the speed of a member of a standard apparatus independently rotating but under the same conditions, in the case of a meter for instance, of load. The testing is effected by scanning a band of alternating black and white, or light-absorbing and light-reflecting marks provided on each of said members each by means of a photo-electric head. The sequence of light fluctuations scanned at the rotation of the members is then converted into electric impulses which are fed to two synchronous motors each one associated with one of the two photo-electric heads. At the shaft of each of the motors a speed is thus produced which is proportional to the speed of the rotating member associated therewith.

A principal object of the invention is to provide an apparatus of this type which indicates directly the relative error of the meter or other apparatus to be tested, that means the relation of the speed difference of the member to be tested and the standard member to the speed of the standard member.

The fundamental feature of the invention thus is that in an apparatus of the invention with pointer and scale and appropriate graduation of the scale the percentage of error in speed made by the member to be tested may be read directly from the scale.

Another object of the invention is a particular computing device to show this relative error.

A further object of the invention is the development of this apparatus so as to equalize non-uniformities within individual revolutions of the member to be tested with the effect that in this development of the invention the computing device does not indicate the instantaneous error but the mean error produced in a revolution of the meter or other apparatus.

Other objects and features of the invention will become apparent as the specification proceeds.

The invention will now be more specifically described with reference to the accompanying drawings which are to be understood explicative of the invention and not limitative of its scope.

Figure 1:
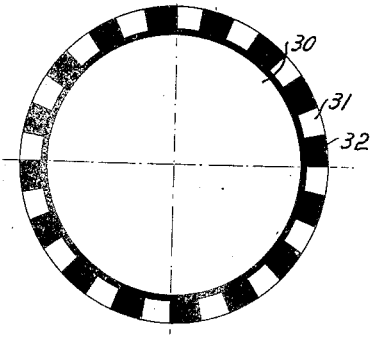
Fig. 1 shows a plan view of a rotary member with a band of alternating black and white marks.
Figure 2:
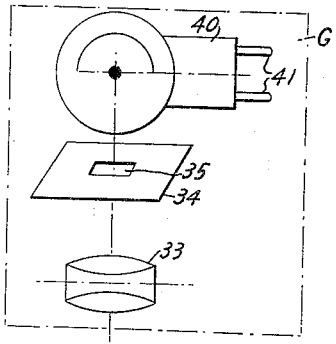
Fig. 2 illustrates diagrammatically a photoelectric head.

The apparatus is based on the optical observation of the speed of the disc of the standard meter, and that of the meter to be verified. This observation is carried out as follows: Near the edge of the disc 30 are arranged, equally sized, white and black sectors 31, 32 (Fig. 1). The movement is observed by a photo-electric head, generally designated by G, Fig. 2. A lens 33 forms the image of the sector in a plane 34. A small window 35 is provided in this plane, the dimensions of which coincide with those of the image of the sector. Behind the window there is located a photoelectric cell 40. The light passing through the window corresponds only to a small area of the disc, i. e., to that covered by one sector.

The disc is illuminated with constant intensity light, employing either continuous current or alternating current of very low voltage.

Figure 3:
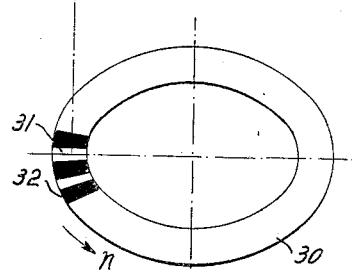
Fig. 3 shows the curve form of the electric impulses produced in the photo-electric head.

Upon rotation of the disc, the intensity of the light on the photoelectric cell is represented by Fig. 3. The fundamental frequency of the photoelectric current is proportional to the speed and to the number of white sectors of the disc.

The meters commonly used, even if built for the same intensity, have not the same constants. This circumstance has been taken into account. Let us take:

C—the meters constant, expressed in turns of the disc per kilowatt hour measured, kwh.
W—the load passing through the two meters, expressed in killowatts.
$n$—the disc revolutions per minute.
$N$—the number of white sectors.
$f$—the frequencies of the currents produced in the photoelectric cells.

The magnitudes corresponding to the meter to be tested, and to standard meter, respectively, are designated by the subindexes 1 and 2.

The number of revolutions per minute is:

$$n_1 = \frac{C_1 \cdot W}{60} \qquad n_2 = \frac{C_2 \cdot W}{60}$$

The frequencies produced are:

$$f_1 = \frac{n_1 \cdot N_1}{60} \qquad f_2 = \frac{n_2 \cdot N_2}{60}$$

If the meter being tested works correctly, that is to say, without error, and said meter, as well as the standard meter, fulfills, due to inherent constructional characteristics, the following conditions:

$$n_1 . N_1 = n_2 . N_2 = \text{constant number}$$

the two frequencies are of the same value.

If the ordinary meter disc rotates at the actual speed, its relative error is:

$$\text{Relative error} = \frac{\text{Actual speed} - \text{correct speed}}{\text{Correct speed}}$$

or, expressed in function of the frequencies:

$$\text{Relative error} = \frac{\text{Actual frequency} - \text{correct frequency}}{\text{Correct frequency}}$$

The frequency produced by the standard meter is the correct one. Thus, the relative error of the meter to be tested is:

$$\text{Relative error} = \frac{f_1 - f_2}{f_2}$$

Consequently, provided the preceding condition is fulfilled, which is possible for the constants of many meters, the outcome is found by a single standard meter.

This is the second characteristic feature of the present invention.

Figure 4:
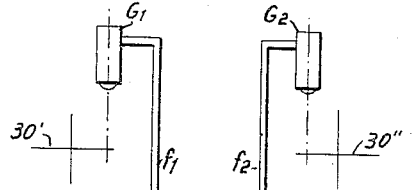
Fig. 4 is a diagrammatic illustration of the complete apparatus.

The currents generated in the photoelectric heads $G_1$ and $G_2$, Fig. 4, are amplified by the amplifiers $Q_1$ and $Q_2$, especially designed for the lowermost frequencies which are being employed.

The output circuits of these amplifiers are connected to two especially designed synchronous motors $M_1$ and $M_2$, providing exactly proportional speeds at the frequencies $f_1$ and $f_2$.

Thus, the error of the conventional meter is:

$$\text{Relative error} = \frac{v_1 - v_2}{v_2}$$

The velocity $v_1$ is produced by the motor $M_1$ and is proportional to the frequency $f_1$. Similarly for $v_2$.

A differential gear provides the following speed:

$$v_3 = \frac{1}{2}(v_1 - v_2)$$

therefore, the relative error is expressed by:

$$\text{Relative error} = 2\frac{v_3}{v_2}$$

The sphere 44 (Fig. 5) of the computing device is rotatably mounted upon the wheels $R_1$ and $R_2$. A and B are the contact points between the sphere and said wheels. If the speeds of $R_1$ and $R_2$, or action wheels, are $v_3$ and $v_2$, respectively, the angle $a$ determined by the arm 46 and the free wheel 45, is determined by the following equation:

$$\tan a = \frac{v_3}{v_2}$$

Figure 6:
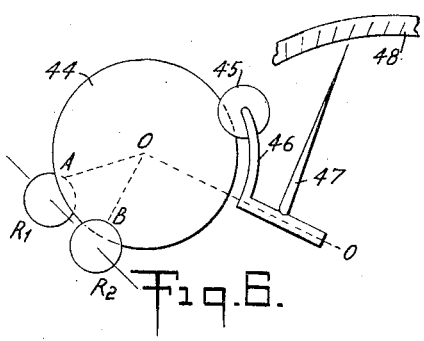
Figure 10:
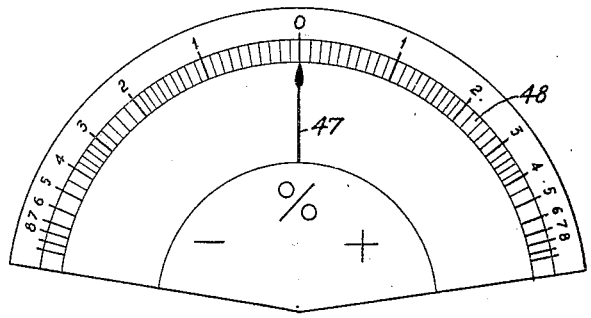
Fig. 10 shows in plan view and diagrammatically the scale with pointer of the computing device.

The pointer 47, attached to the arm 46, passes over a scale 48, directly calibrated in percentage of relative errors (Figs. 6 and 10). If we designate with $k$ a proportionality factor, the relative error is finally represented by:

$$\text{Relative error} = k \tan a$$

The sensibility is improved by adequate multiplication of the speed $v_3$, and a suitable reduction of $v_2$.

The third characteristic feature of the present invention is the use of small synchronous motors in combination with a differential gear, transformation of speeds and free spherical ball, for the direct determination of the relative error, in the manner described.

Having explained the theory of the apparatus, the constructional details will now be described.

According to a study of the values of the speeds of conventional single-phase meters, built for 220 volts, 50 cycles, we find that a suitable value for the product $(n.N)$ is 660.

Consequently, the resultant normal frequency varies from 11 to 1,1, cycles per second, for loads varying from 100% down to 10% respectively. The number of white sectors varies from 9 to 40.

For three-phase meters, the computations are similar.

The objective of the photoelectric head is formed by two large diameter convergent lenses. The entire assembly G, Fig. 2, or $G_1$, $G_2$, Figs. 4 and 11, formed by the lens, the rectangular window and the photoelectric cell, is mounted within a metallic tube.

This tube has two separate covers, one for the observation of the focal plane and the other for positioning the photoelectric cell. A suitable tripod, provided with the well known supporting means, enables the adjustment of the photoelectric-head to the correct position.

The amplifier is a common resistance-capacity coupled amplifier generally indicated by $Q_1$, $Q_2$ in Fig. 4. The output stage is constituted by a detector tube. No details of this amplifier are given, since it does not constitute part of this invention.

Figure 7:
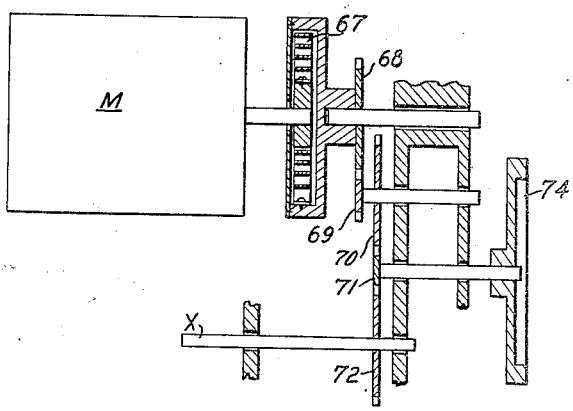
Fig. 7 shows an elevation of the speed multiplier with equalizing device.

For the utilization of the motor M (Fig. 7), a device is used which will transform the variable speed of the motor into a uniform speed.

This device is constituted by a steel spring 67, the gears 68, 69, 70, 71, 72, for the purpose of multiplying the speed and a flywheel 74. If the unit is correctly assembled, the output speed in the shaft X will be sufficiently uniform.

The constructive arrangements just described, provide a synchronous motor suitable for the desired purpose.

Figure 8:
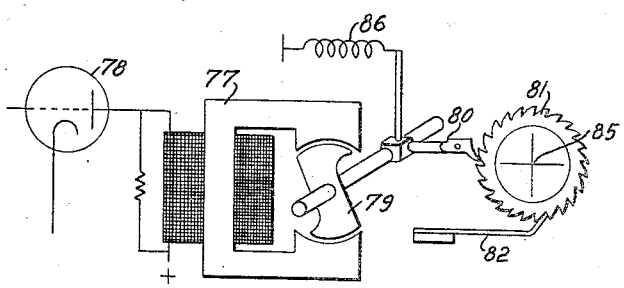
Fig. 8 shows diagrammatically another embodiment of a rotary relay.

An alternative solution is given for the construction of the impulse motor. According to Fig. 8, this solution consists of a powerful impulse relay 77, excited by a special triode tube 78.

Corresponding to each advance of the piece 79, the finger 80 advances the toothed wheel 81 one step, said wheel being retained by the resilient strip 82. The shaft 85 is the driving axle, and is followed by the regulator device just described.

The spring 86 returns the piece 79 to idle position.

Figure 9:
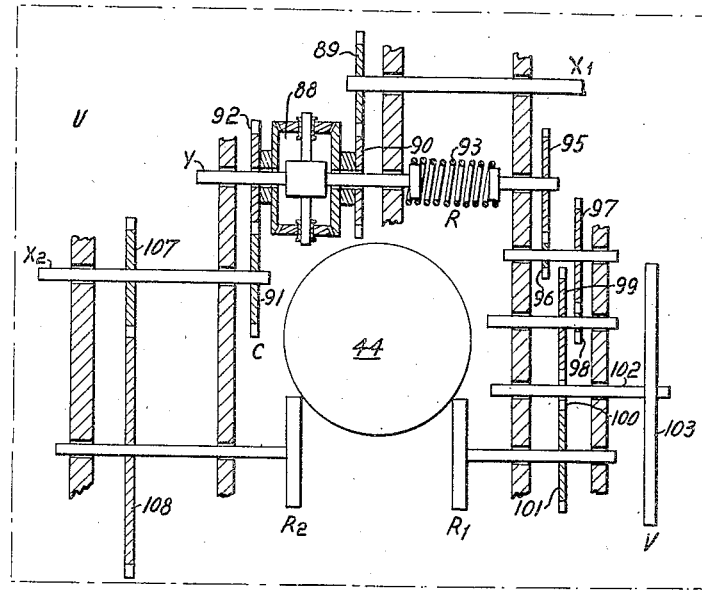
Fig. 9 illustrates diagrammatically an indicator or computing device of the invention.

The indicator mechanism generally designated by U will now be described. The output shafts of the two small motors $M_1$, $M_2$, are $X_1$ and $X_2$ (see Fig. 9). A differential gear 88 is actuated with the toothed wheels 89, 90, 91 and 92, the axle Y of said gear 88 being connected to a spring 93.

The toothed wheels 95, 96, 97, 98, 99 and 100 multiply the difference of speeds given by the shaft Y. The shaft 102 moves a small flywheel 103, and through the toothed wheels 100 and 101, moves action wheel $R_1$.

The speed of shaft $X_2$ is reduced by the toothed wheels 107 and 108, the latter being journalled on the shaft of action wheel $R_2$.

Figure 5:
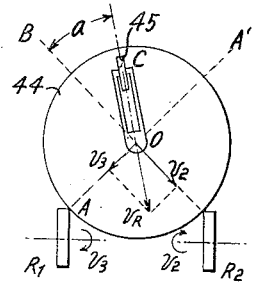
Figs. 5 and 6 illustrate respectively in front view and in perspective a computing device of the apparatus of the invention.

The sphere 44 is supported by $R_1$, $R_2$ and the free or computing wheel 45, as is indicated in Figs. 5 and 6.

As is known, the speed of the disc in some types of meters is not uniform, in a complete revolution. The mean error corresponding to a revolution should be ascertained. This condition is fulfilled if the action wheel $R_1$ turns at an average speed.

This is done, in the desired degree, by the spring 93, the multiplication of speed and the flywheel 103 in the form just described.

It is not necessary that the speed of $R_2$ be entirely uniform, since the additional errors so introduced are usually negligible. In fact, even if the variation in the speed of $R_2$ should amount to 5%, and if the error of the meter is for instance, 1%, the instrument will indicate 0.95% to 1.05%. This difference is negligible. The speed governors of the motors will, of course, reduce the variations of $R_2$ to the minimum required value.

The rotary arm 46 (Fig. 6), completes the indicator mechanism. The shafts of the pieces $R_1$, $R_2$ and 46 have ruby bearings and also the thrust-bearings are provided with rubies.

The wheel 45 (Fig. 6), and the shaft 102 (Fig. 9) have also bearings incorporating rubies.

The theoretical representation of the scale is shown in Fig. 10. This symmetrical scale shows that, between minus 2 and plus 2%, it is possible to obtain readings with an approximation of 0.1%. This approximation, between 2 and 4%, is reduced to 0.2%.

Figure 11:
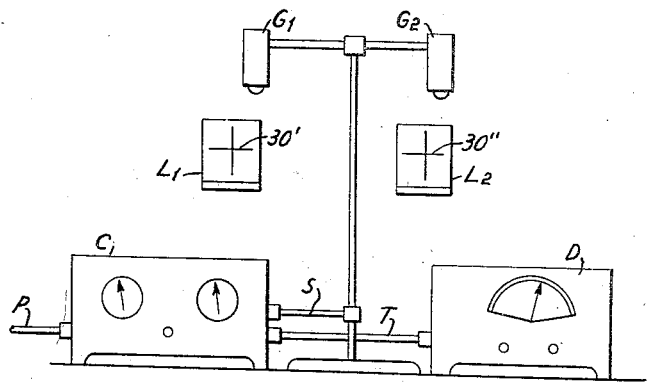
Fig. 11 shows schematically the general constructive arrangement of the testing apparatus.

The general constructive arrangement of the apparatus is shown in Fig. 11. $G_1$ and $G_2$ are the photoelectric heads. The box C contains the amplifiers and necessary rectifiers. Box D contains the indicator and also all the mechanical equipment. The letters $L_1$ and $L_2$ designate the conventional and the standard meter respectively. P, S, and T are electric conductors.

From the description and accompanying drawings, the advantages inherent to the instrument under consideration will become apparent, both as regards the simplicity of operation in comparison with the usual methods of regulating meters, as well as regarding the greater speed of regulation and greater accuracy obtained. The apparatus as described thus accomplishes the following:

Through the synchronous motors, speeds proportional to those of the reference elements or members are determined;

Through the use of a differential gear, the difference of the speeds is determined;

Through the speed multiplier, the sensitivity is increased by suitable multiplication of the differential speed with relation to the standard speed;

By causing the differential speed, after being multiplied, to act on an action wheel of a spheric ball in a computing device, and supplying to another action wheel of the spheric ball a speed proportional to the speed of the standard meter or other apparatus, the third free computing wheel will shift its position on the sphere in accordance with the relation of differential speed to standard speed. A pivotable arm with pointer actuated by the deviations of the computing wheel will thus cause the pointer to indicate directly on a scale the relative speed error or percentage of error of the meter to be tested.

Through the elastic transmission within the speed multiplier and the flywheel on one of its shafts, the apparatus indicates not the instantaneous error within an individual revolution but the mean error produced in the revolutions of the meter.

The motors actuating the computing devices, in the embodiment of the invention illustrated, are frequency-controlled by the electric impulses generated in the photo-electric heads. Their speed therefore is proportional to the speed of the member with which they are associated. Since, however, the motors are energized independently of the photo-electric device, they may supply at their shafts any amount of energy required for the actuation of the computing device without affecting the efficiency and precision of the speed control.

It is evident that several modifications and alterations may be made by those skilled in the art, without departing from the scope of the invention as clearly set forth in the appended claims.

I claim:

1. Apparatus for testing the speed of a rotating member, such as a shaft, disc of a meter and similar apparatus, in comparison with the speed of a rotating standard member, wherein a band of alternating light-absorbing and light-reflecting marks is provided on each of said members, and wherein two photo-electric heads are provided each one adapted to scan one of said bands and to convert the sequence of light fluctuations scanned at the rotation of the appertaining member into a sequence of electric impulses, a synchronous motor being associated with each one of said photo-electric heads and adapted to be electrically driven under frequency-control by the electric impulses of said sequences synchronously therewith, for thus producing at the shaft of each of said motors a speed proportional to the speed of said rotating member associated therewith; characterized by differential gear means being coupled to the rotary member for producing the differential of both said motor speeds, said apparatus further including a computing device adapted to be actuated by said differential speed and the speed of said motor associated with said standard member for thus computing the relation of the speed difference of said member to be tested and said standard member to the speed of said standard member.

2. Apparatus for testing the speed of a rotating member, such as a shaft, disc of a meter and similar apparatus, in comparison with the speed of a rotating standard member, wherein a band of alternating light-absorbing and light-reflecting marks is provided on each of said members, and wherein two photo-electric heads are provided each one adapted to scan one of said bands and to convert the sequence of light fluctuations scanned at the rotation of the appertaining member into a sequence of electric impulses, a synchronous motor being associated with each one of said photo-electric heads and adapted to be driven under frequency-control by the electric impulses of said sequences, synchronously therewith, for thus producing at the shaft of each of said motors a speed proportional to the speed of said rotating member associated therewith; characterized by a differential gear being provided in driven connection with the shafts of said synchronous motors and adapted to yield at its outgoing differential shaft the differential of both said motor speeds; a speed multiplier associated with said outgoing differential shaft for multiplying said differential speed; said apparatus further including a computing device adapted to be actuated by said speed multiplier and by a driving element driven by said shaft of said motor associated with said standard member; said computing device further including a driven computing element and means for transforming said multiplied differential speed and the speed of said driving element into a resultant angular deflection of said driven computing element, and a pointer with scale, said driven computing element adapted to deflect said pointer with relation to said scale so as to show said resultant deflection on said scale as the relation of the speed difference of said member to be tested and said standard member to the speed of said standard member.

JAIME SALLÉS.

REFERENCES CITED

The following references are of record in the file of this patent:

UNITED STATES PATENTS

| Number | Name | Date |
|---|---|---|
| 706,554 | Hall | Aug. 14, 1902 |
| 1,256,234 | Innes | Feb. 12, 1918 |
| 1,721,375 | DeKoning | July 16, 1929 |
| 1,878,658 | Aronoff | Sept. 20, 1932 |
| 2,387,901 | Haverstick | Oct. 30, 1945 |